(12) United States Patent
Milliken

(10) Patent No.: US 10,906,482 B2
(45) Date of Patent: Feb. 2, 2021

(54) REAL-TIME PERFORMANCE TUNING

(71) Applicant: Powerteq LLC, Bowling Green, KY (US)

(72) Inventor: Timothy G. Milliken, Bowling Green, KY (US)

(73) Assignee: Powerteq LLC, Bowling Green, KY (US)

( * ) Notice: Subject to any disclaimer, the term of this patent is extended or adjusted under 35 U.S.C. 154(b) by 43 days.

(21) Appl. No.: 15/165,611

(22) Filed: May 26, 2016

(65) Prior Publication Data
US 2017/0341603 A1    Nov. 30, 2017

(51) Int. Cl.
*B60R 16/023*  (2006.01)
*G06F 9/4401*  (2018.01)
*G06F 12/1009* (2016.01)

(52) U.S. Cl.
CPC .......... *B60R 16/023* (2013.01); *G06F 9/4411* (2013.01); *G06F 12/1009* (2013.01); *G06F 2212/65* (2013.01)

(58) Field of Classification Search
CPC .................................................. B60R 16/023
See application file for complete search history.

(56) References Cited

U.S. PATENT DOCUMENTS

| 4,199,039 | A  | 4/1980  | Ciemochowski |
| 4,232,372 | A  | 11/1980 | Berent |
| 6,125,467 | A  | 9/2000  | Dixon |
| 6,482,698 | B2 | 11/2002 | Daniela et al. |
| 6,535,811 | B1 | 3/2003  | Rowland et al. |
| 6,721,648 | B2 | 4/2004  | Masters et al. |
| 7,050,899 | B2 | 5/2006  | Masters et al. |
| 7,113,077 | B2 | 9/2006  | Masters et al. |
| 7,145,324 | B2 | 12/2006 | Masters et al. |
| 8,718,905 | B2 | 5/2014  | Mosher et al. |
| 8,738,270 | B2 | 5/2014  | Emberson et al. |
| 9,488,116 | B2 | 11/2016 | Mosher et al. |
| 2001/0049166 | A1 | 12/2001 | Peschiaroli et al. |
| 2003/0084229 | A1* | 5/2003 | Ho ............................ G06F 8/66 711/102 |
| 2005/0116703 | A1 | 6/2005 | Masters et al. |
| 2005/0216132 | A1 | 9/2005 | Masters et al. |
| 2006/0164229 | A1 | 7/2006 | Masters et al. |
| 2013/0261874 | A1* | 10/2013 | McQuade ............... F02D 29/02 701/29.1 |
| 2014/0046574 | A1 | 2/2014 | Eisenbarth et al. |
| 2016/0378341 | A1* | 12/2016 | Long ..................... G06F 3/0604 711/103 |
| 2017/0028946 | A1 | 2/2017 | Mizell et al. |

FOREIGN PATENT DOCUMENTS

CA        2787806        2/2014

* cited by examiner

*Primary Examiner* — Imran K Mustafa
(74) *Attorney, Agent, or Firm* — Middleton Reutlinger

(57) ABSTRACT

The present invention is a system and method of making setpoint adjustments to a vehicle control computer in a real time manner in order to enable the one performing the programming to observe the changes in vehicle characteristics in real time. The system and method is an improvement over known methods in that it does not require the programmer to repeatedly stop and start the operation of the vehicle in order to verify that any changes have the desired result.

11 Claims, 5 Drawing Sheets

REAL-TIME PERFORMANCE TUNING

TECHNICAL FIELD

Exemplary embodiments of the present invention relate generally to a system and method for adjusting the performance of an automobile by changing various setpoints used by an automotive electronic control module to manage certain characteristics of an automobile.

BACKGROUND AND SUMMARY OF THE INVENTION

Modern automobiles may utilize computerized control systems to operate the various systems that comprise the automobile. These computerized systems have replaced the mechanical controllers that have been used in the past to control these systems. Generally referred to as Vehicle Electronic Control Units (ECU's), such controllers are able to manage the systems of an automobile much more efficiently than the mechanical devices used in the past. As a result, current automobiles are generally much more efficient and drivable than they were previously. ECU's are essentially dedicated computers that utilize setpoints and control curves to regulate vehicle systems. Despite the improvements in performance generally, it is often the case that certain performance characteristics are set so as to balance vehicle configuration to achieve drivability parameters that are important to the particular vehicle manufacturer. For example, a manufacturer may desire to obtain a certain level of fuel economy or to set vehicle behavior characteristics in such a manner as to satisfy a "typical driver." A manufacturer may configure these settings to avoid allowing a vehicle to exceed certain operating parameters that could result in damage to the vehicle caused by an inexperienced driver.

While the use of ECU's may provide many benefits with regard to improvements in general performance of a vehicle, their use has also made it more difficult for enthusiasts to modify their vehicle in order to customize its performance characteristics. Prior to widespread use of ECU's, an owner wishing to improve certain vehicle traits could modify or replace the various mechanical components that regulated the desired vehicle operating characteristic. For example, an owner could modify the ignition system to change the manner in which the ignition timing would react to engine speed or load. In another example, an owner could replace or modify the fuel system of a vehicle to enable more precise metering of fuel. Transmissions could similarly be modified to change their shift points to suit an owner's preferences.

With the advent of ECU's, vehicle owners were initially unable to modify engine characteristics as they had been able to with mechanical systems. However, over time, technically savvy enthusiasts developed methods to enable an owner to change the various setpoints used by an ECU. These methods initially entailed replacing certain electronic memory components in which the setpoints were stored. As ECU and electronic memory technology improved, it became possible to make adjustments to the various setpoints by reprogramming the memory devices without requiring their replacement. This was typically performed by connecting a programming device to a vehicle diagnostic port and storing adjustments to the stored setpoints. Because the setpoints were stored in read only memory (ROM), these adjustments required that a user reprogram the memory while the vehicle was not operating. After reprogramming, the vehicle was restarted, allowing the ECU to read the new setpoints from memory and copy them into working memory (known as random access memory or RAM). Various advances in memory technology made it possible to program only select parts of the ROM, speeding up the reprogramming process but still requiring that the vehicle be restarted in order for the programming changes to take effect. This limitation does not allow a user to make adjustments in real-time in order to gauge the effect of the change on engine and other system characteristics. What is needed is a system and method for making changes to the ECU setpoints in real-time and later store those changes when an optimal set of operating characteristics are achieved.

In an embodiment of the invention a user may be able to connect a real-time programming system to an ECU and select one or more setpoints for modification. When the setpoints are selected, the vehicle may be started and while the vehicle is running, the user may make adjustments to the selected setpoints in order to determine if the resultant changes have the desired result. In such an embodiment the setpoints for programming may be determined by decompiling or otherwise reverse engineering the ECU software in order to determine where the various setpoints are stored in the operating memory of the ECU. In certain embodiments of the invention, the programming device may further comprise an electronic display in order to permit the user to view the setpoints used by the ECU of a vehicle. In such embodiments, a user may select and modify the various setpoints while monitoring the selected setpoint values on the programming device. Such an embodiment may be configured to permit the user to store the setpoints in the ECU when the programming is complete so that the setpoint settings will be preserved. Embodiments of the invention may be equipped with algorithms that prevent the user from making rapid changes to a selected setpoint so as to help prevent unintentional vehicle damage caused by a setpoint selection that was radically different than what was intended for the setpoint being modified.

Further features and advantages of the devices and systems disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
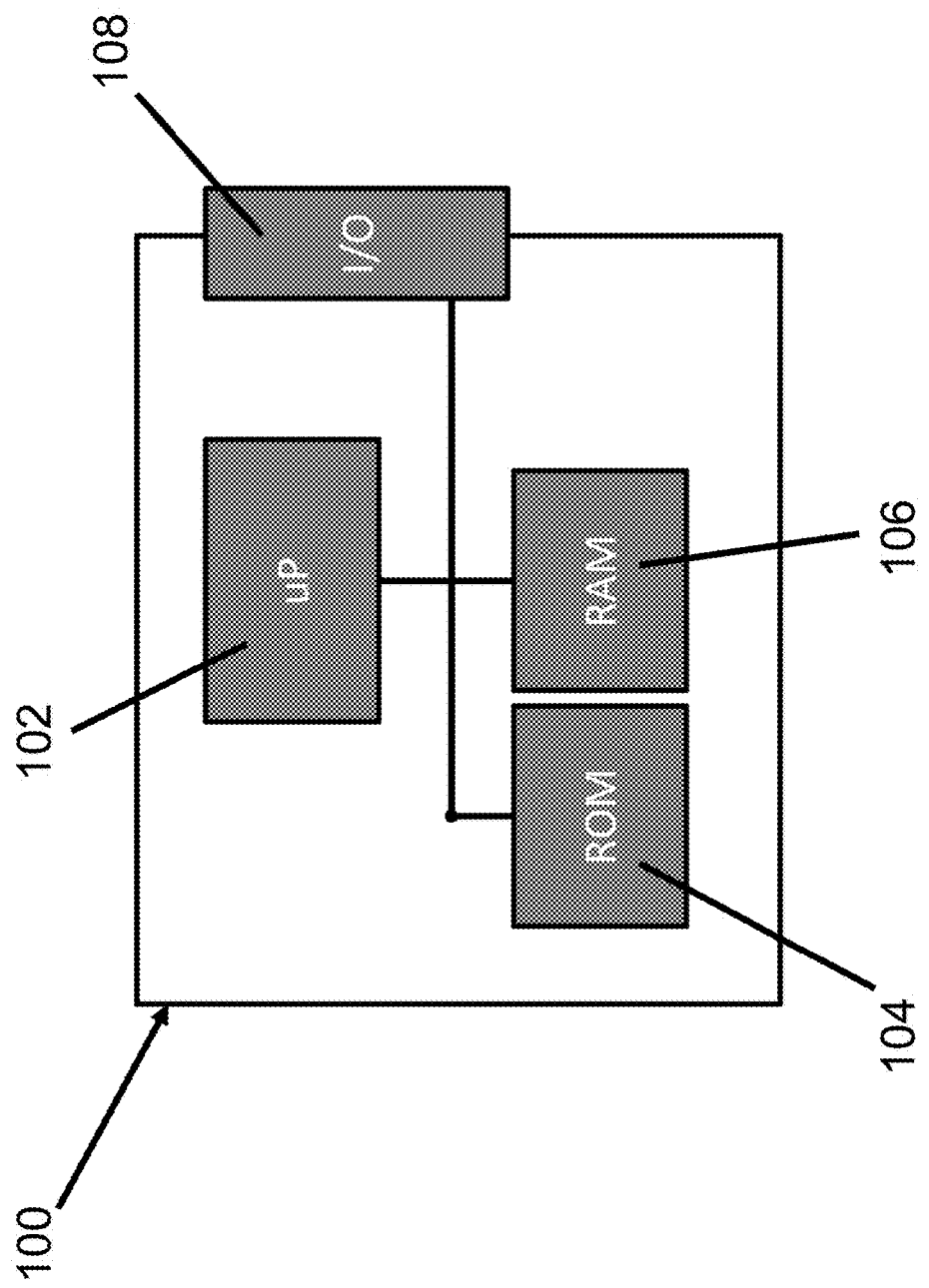
FIG. 1 is a block diagram of an exemplary vehicle electronic control unit (ECU)
Figure 2:
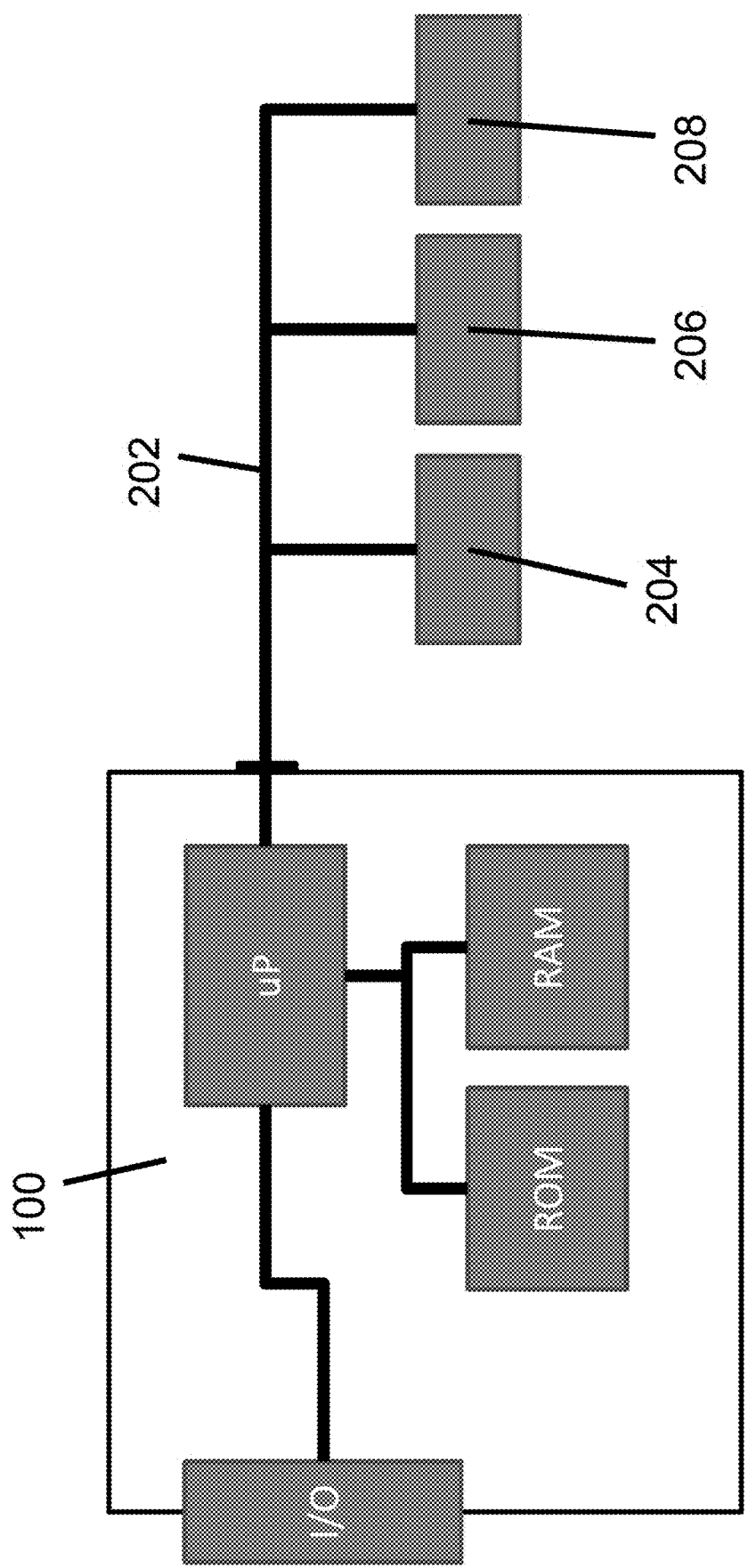
FIG. 2 is a block diagram of a vehicle control system utilizing an ECU in electronic communication with various other controllers through a communications bus.

A basic diagram of a Vehicle Electronic Control Unit (ECU) is illustrated in FIG. 1. As is illustrated, a typical ECU 100 comprises a controller 102, and a memory further comprised of a read only memory (ROM) 104 for storing operating instructions and setpoints. Memory may also comprise random access memory (RAM) 106 which the controller 102 uses during the process of executing the stored instructions. In addition, an ECU may comprise an input/output section 108 which may provide a communications interface to other controllers or inputs and outputs to various vehicle systems and sensors. As is illustrated in FIG. 2, an ECU 100 may be just one component in a vehicle control system. As illustrated, other controllers may be in communication via a communications bus 202. The communications bus 202 may be in electronic communication with additional controllers comprising devices such as transmission controllers 204, an engine control module (ECM) 206 and diagnostic ports 208. One ordinarily skilled in the art will appreciate that the listed controllers are but a small portion of the devices that may be in communication with an ECU 100. As vehicles become more computerized, the number of devices in communication with the ECU 100 may increase dramatically. The detailed description provided herein will generally refer to interactions with the ECU 100 but the systems and methods described should not be limited to just an ECU. For example, in certain automotive applications, an engine control module (ECM) 206 may directly control certain engine operation characteristics. In such an application, an embodiment of the invention may perform the disclosed functions with regard to the ECM 206 and not the ECU 100. Thus, it is not the intention of the Applicant to limit the claimed invention to just an ECU 100. Therefore, references to a controller should be interpreted to refer to an ECU, an ECM or other electronic control device in communication with the communications bus 202 of an automobile.

As was noted above, a controller may retrieve programming instructions from ROM. These programming instructions may comprise instructions to cause the processor 102 to perform various operating functions needed to control vehicle components such as engine fuel injection or ignition processes. Included in these instructions are directions to the storage locations of various setpoints. These directions are commonly referred to as "pointers". As a greatly simplified example, if a program is comparing such inputs as a throttle position and engine speed in order to determine an amount of fuel to be injected into an engine cylinder, that program may use a pointer to identify a memory location in which data is stored that represents the proper amount of fuel. As with program instructions and setpoints, pointers are generally stored in ROM. ROM is a memory technology that is generally not intended to be regularly reprogrammed and as such, changing information stored in the ROM of an ECU or other vehicle controller must generally be performed when the controller is not actively performing its control function. As a result, making changes while a vehicle is running is generally not possible without the risk of damage.

When making adjustments to the various parameters of a vehicle, a user may wish to make those adjustments while the vehicle is running in order to receive immediate feedback with regard to the result of the adjustments. As was noted above, known methods of changing setpoint information are generally not able to be performed while a vehicle is running. In order to avoid making changes to ROM while a vehicle is running but be able to receive the desired immediacy of feedback, an embodiment of the invention may modify program pointers to direct the processor 102 to an unused portion of RAM and then place the updated setpoints at that portion of RAM.

Figure 3:
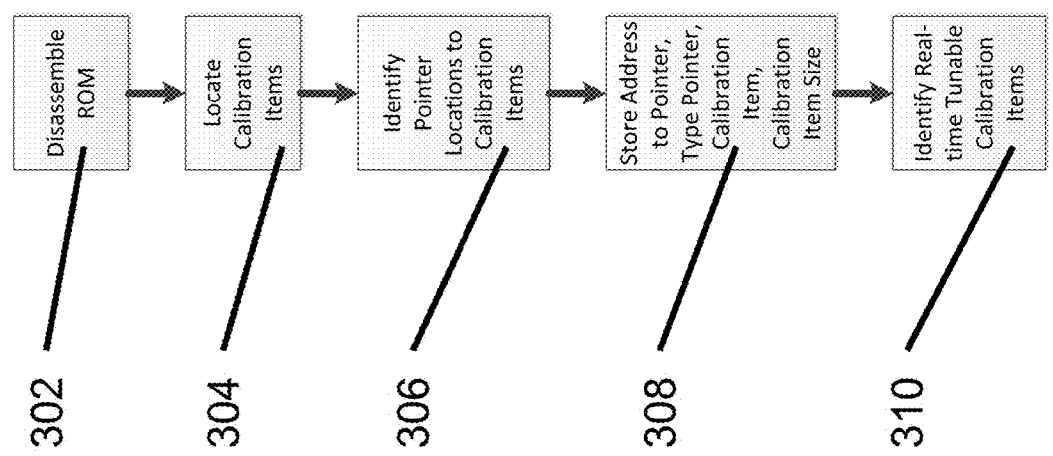
FIG. 3 is a flow chart illustrating steps used in an embodiment of the invention to identify real-time calibration setpoints and control curves.

Because the manufacturer of the ECU may be unwilling to disclose the details regarding software instructions and pointers, those instructions must be analyzed to identify the various pointers used by the software instructions of an ECU. Referring to FIG. 3, in an embodiment of the invention, micro-controller instructions stored in the ROM of an ECU or other controller may be analyzed to determine their function and to identify one or more pointers that are used to address vehicle operating parameters 302. This process is often referred to as disassembly. Such a process in general is well known by one ordinarily skilled in the art of embedded software and related hardware. As is illustrated at step 304, calibration items are identified and corresponding pointer locations are noted 306. These items and pointers are stored along with information regarding the type of pointer, the purpose of the calibration item and the calibration item size 308. Additionally, those calibration items that may be tuned in a real time manner may be identified 310.

Figure 4:
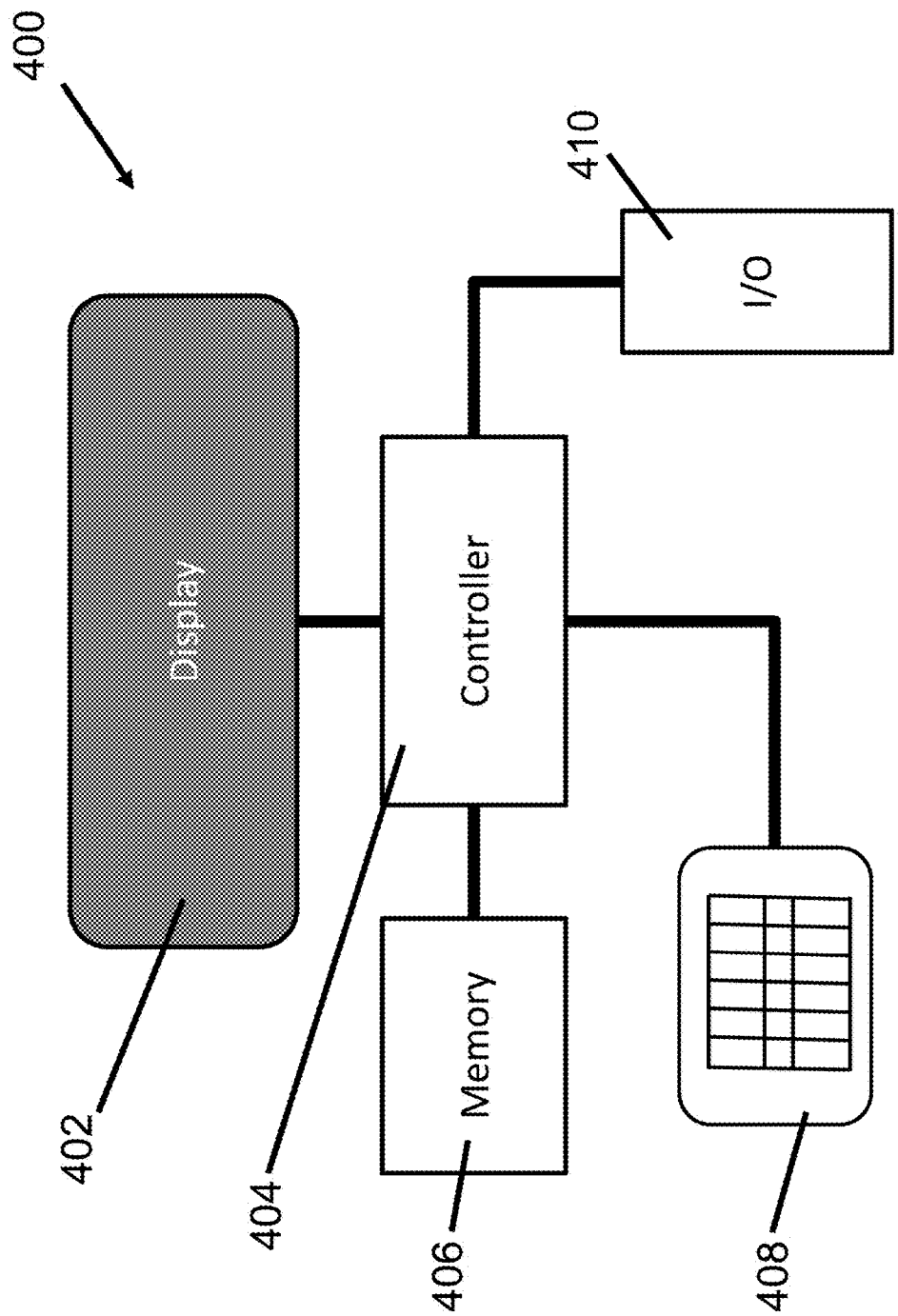
FIG. 4 is a block diagram of an embodiment of a real-time tuning device.

Once the various calibration items and pointers are identified as described above, those items may be used to enable a user to make adjustments to a vehicle while it is in operation (in real-time). An embodiment of the invention may employ a computerized real time tuning device to perform the real time tuning operation. An example of such a device is illustrated in FIG. 4. As is illustrated, such a device 400 may comprise a display 402, a processor 404, a memory 406, and an input device such as a keyboard 408. The device 400 may also comprise an input/output (I/O) connection 410. Such an I/O connection may be configured to interface with a diagnostic port 208 of a vehicle to be adjusted or tuned.

Figure 5:
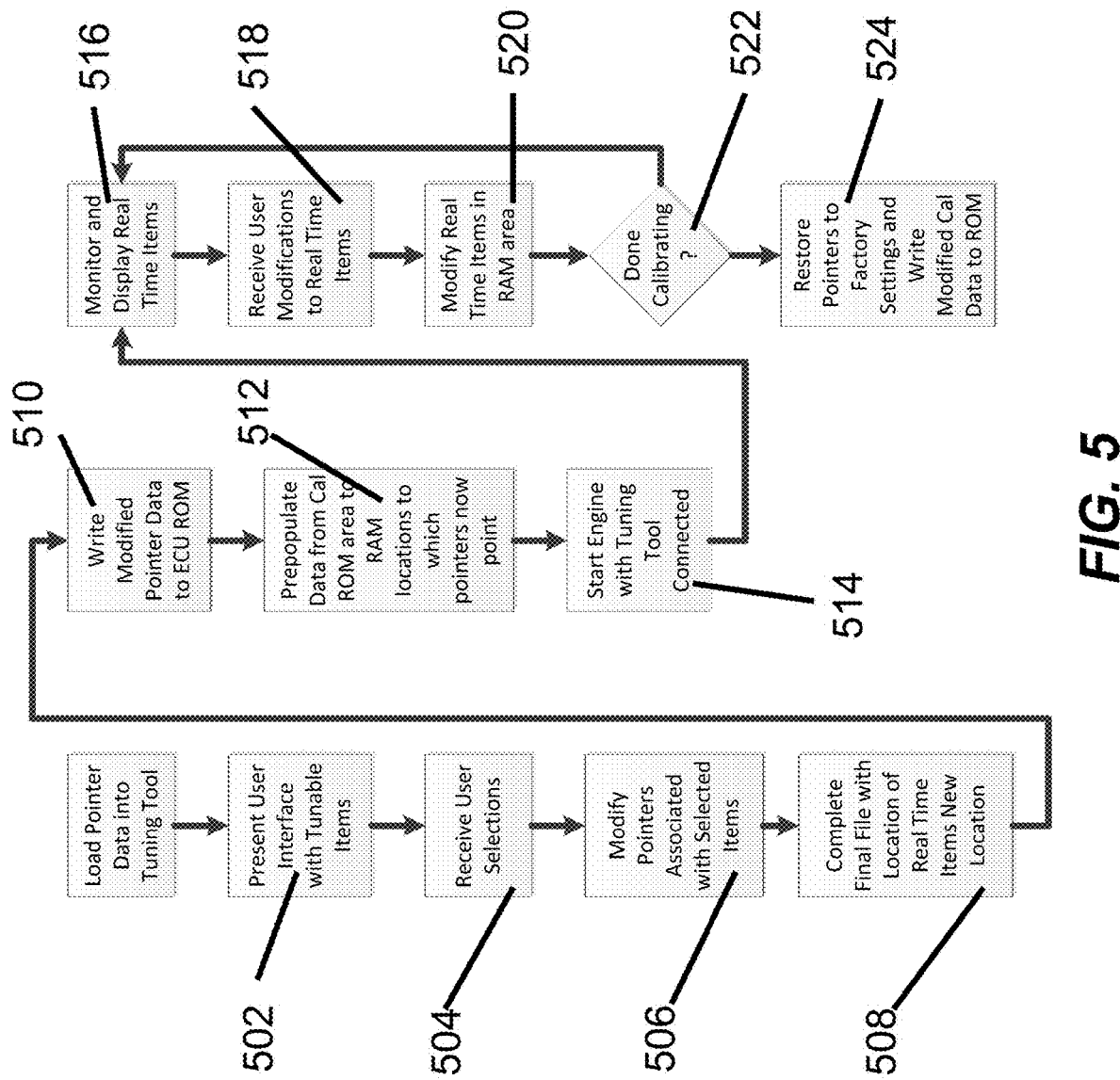
FIG. 5 is a flow chart of the steps used by an embodiment of the invention to perform real time programming.

Once pointer and setpoint information is identified, the information may be loaded into a real-time tuning device 400 such as illustrated in FIG. 4. The device 400 may comprise software instructions which, when executed by the processor 404 may interact with a user to enable that user to tune a vehicle in real-time. Referring to FIG. 5, such software may configure the device 400 to present the user with a list of tunable items 502 as identified in FIG. 3. The user may select one or more such items and enter the selections using an input device 408. An embodiment of the device 400 may receive the user's selections in step 504. Once one or more tunable items are selected by the user, the device 400 may modify the data representing the selected pointer 506. Such modification may comprise redirecting the pointer to a predefined location in RAM. As will be described herein, locations in RAM may be modified while a vehicle is in operation without having to restart or otherwise interrupt the operation of the ECU. Once the data has been modified for all selected pointers, the device 400 may create a file comprising these modifications 508 and store (write) the file to the ECU ROM 510. As the result of these modifications, when an ECU is operating, the programming of the ECU will result in the controller 102 attempting to retrieve operating setpoints from the predetermined locations in RAM that were noted above rather than the locations in which such data was originally stored. As illustrated in step 512, an embodiment of the invention may then pre-populate these predetermined locations with data retrieved from the original setpoint storage locations 512. In order to start the real time tuning process, a user may start the engine of the vehicle 514 with the tuning device 400 connected via the diagnostic port 208. By prepopulating the predetermined memory locations with the original setpoints, the pointers used by the ECU will initially retrieve the original setpoint values, thus ensuring that the vehicle will operate normally when first started. When the vehicle is running, the software of the tuning device 400 may be configured to display 516 real-time tuning items in the display 402 of the tuning device. A user may then decide which items should be modified and enter those modifications into the tuning device 400 using an input device 408. The software of the tuning device may configure the processor to receive the modified values 518. These modified values may be stored in the predetermined RAM locations in step 520. Because the pointer locations have previously been modified, the ECU uses these modified values in the operation of the vehicle, thus providing feedback to the user in real-time. For example, should ignition timing be advanced beyond a certain value, pre-ignition could occur. As sustained pre-ignition could result in damage to an engine, an embodiment of the invention could allow a user who has made adjustments that result in pre-ignition to quickly and easily reverse those adjustments to reduce or eliminate the pre-ignition without having to perform the known methods of reprogramming which would require that user to shut the vehicle down, make the adjustments, restart the vehicle and repeat this entire process until the pre-ignition is corrected. The process of modifying real time setpoints may be repeated 522 until the user is satisfied. When the user is satisfied with the chosen setpoint values, the tuning device 400 software instructions may cause the processor of the tuning device to reset the pointers modified in step 506 back to their factory settings and write those pointers as well as the modified setpoint values to the ECU ROM 104 at step 524. Once this information is stored in the ROM of the ECU, the ECU will load the reset pointers and the modified setpoint data when the vehicle is restarted, thus making the settings permanent until the user desires to update them again. A person ordinarily skilled in the art will understand that the disclosed method of real-time programming of ECU operating setpoints may improve a user's ability to quickly and safely make tuning adjustments to a vehicle.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A method of programming a vehicle control computer comprising the steps of:

receiving, at a personal controller, existing data pertaining to a programmable performance parameter for a vehicle;

identifying an existing pointer in said existing data, said existing pointer being stored in a first memory and pointing to a first existing memory location in said first memory, said first existing memory location being where a first existing setpoint for said performance parameter is located in said first memory;

modifying said existing pointer, in said first memory, to point to a second location for said performance parameter, said second location being located in a second memory;

storing said first existing setpoint for said performance parameter at the second location in said second memory;

changing the setting of said first existing setpoint at said second location in said second memory, wherein changing the setting of said first existing setpoint is through operation of said personal controller, to a desired second setpoint which is different from said first existing setpoint, and wherein changing the setting of said first existing setpoint stores the second setpoint in the second location in said second memory;

subsequent to changing the setting of said first existing setpoint to the second setpoint, and by said personal controller in response to a user indicated satisfaction with the second setpoint:

storing the second setpoint in said first memory in said first existing memory location, storing the second setpoint comprising replacing said first existing setpoint, in said first existing memory location, with said second setpoint; and changing the modified pointer, in said first memory, back to the existing pointer to point to said first existing memory location in the first memory where the second setpoint is stored.

2. The method of claim 1 wherein the first memory is ROM (read only memory) and the second memory is RAM (random access memory).

3. The method of claim 1 wherein data is communicated to the first and second memory using a controller area network.

4. The method of claim 1 wherein the programmable performance parameter is a parameter which controls an operating characteristic of the vehicle.

5. The method of claim 4 wherein the operating characteristic of the vehicle is an engine operating characteristic.

6. The method of claim 4 wherein the operating characteristic of the vehicle is a transmission operating characteristic.

7. The method of claim 1 wherein the existing data further comprises data representing a pointer, a pointer type, a calibration item, and a calibration item size.

8. The method of claim 1 wherein the second memory is located within the vehicle control computer.

9. The method of claim 1 wherein at least the step of changing the setting of the first existing setpoint is performed while the vehicle engine is running.

10. A method of programming a vehicle control computer comprising the steps of:

receiving at a first controller at least one data set identifying a programmable performance parameter, the data set comprising a calibration data value, a pointer, an identifier identifying the pointer type, a performance parameter identifier, and a calibration data value size;

receiving, from a user, a selection of at least one received performance parameter for adjustment;

modifying a pointer associated with the selected performance parameter to identify a memory location in a random access memory;

storing the modified pointer in a read only memory;

storing the calibration data value at the memory location of the random access memory;

receiving a change to the calibration data value to a changed value and storing the changed value in the memory location of the random access memory;

subsequent to receiving the change to the calibration data value to the changed value:

changing the previously modified pointer to a pointer location, in the read only memory, to which the pointer identified prior to the previous modification and storing the modified pointer in the read only memory; and storing the changed value in the pointer location in the read only memory.

11. The method of claim 10 wherein the read only memory is an electrically erasable programmable read only memory.

* * * * *